United States Patent
Fernandez Vazquez et al.

(10) Patent No.: US 11,993,723 B2
(45) Date of Patent: *May 28, 2024

(54) DIGITAL CERAMIC INKJET INKS FOR GLASS AND METHOD FOR OBTAINING SAME

(71) Applicant: TECGLASS SL, Lalin (ES)

(72) Inventors: Javier Fernandez Vazquez, Lalin (ES); Tri Ratna Tuladhar, Lalin (ES)

(73) Assignee: TECGLASS SL, Lalin (ES)

( * ) Notice: Subject to any disclaimer, the term of this patent is extended or adjusted under 35 U.S.C. 154(b) by 477 days.

This patent is subject to a terminal disclaimer.

(21) Appl. No.: 17/272,310

(22) PCT Filed: Aug. 30, 2019

(86) PCT No.: PCT/ES2019/070583
§ 371 (c)(1),
(2) Date: Aug. 31, 2021

(87) PCT Pub. No.: WO2020/043929
PCT Pub. Date: Mar. 5, 2020

(65) Prior Publication Data
US 2021/0395543 A1    Dec. 23, 2021

(30) Foreign Application Priority Data
Aug. 31, 2018  (ES) .................. 201830857

(51) Int. Cl.
*C09D 11/322* (2014.01)
*B41J 2/21* (2006.01)
(Continued)

(52) U.S. Cl.
CPC .............. *C09D 11/322* (2013.01); *B41J 2/21* (2013.01); *B41J 2/2107* (2013.01); *B41M 1/34* (2013.01);
(Continued)

(58) Field of Classification Search
CPC ..... C09D 11/322; C09D 11/101; C09D 11/12; C09D 11/34; C09D 11/36; C09D 11/40;
(Continued)

(56) References Cited

U.S. PATENT DOCUMENTS

| | | | |
|---|---|---|---|
| 2008/0210122 A1* | 9/2008 | Magdassi | B41J 11/0015 523/160 |
| 2014/0044894 A1* | 2/2014 | Shipway | B41M 5/0047 428/29 |

(Continued)

FOREIGN PATENT DOCUMENTS

| | | |
|---|---|---|
| EP | 2826825 A1 | 1/2015 |
| WO | 2015003736 A1 | 1/2015 |

(Continued)

OTHER PUBLICATIONS

International Search Report dated Dec. 12, 2019 (and English translation).

*Primary Examiner* — Manish S Shah
(74) *Attorney, Agent, or Firm* — William H. Honaker; Dickinson Wright PLLC

(57) ABSTRACT

Ceramic inkjet inks for non-porous substrates (such as glass, metals) whereby the viscosity of the inks at the jetting temperature of 33-50° C. is 8-20 mPa·s and increase substantially to more than a factor of 5 (greater than 100 mPa·s) after landing on the substrate. The invention also relates to processing/formulating steps and tuning of the bulk and dynamic properties suitable for (i) inkjet printing in the printhead channel and (ii) desirable high viscosity after landing on the glass substrate. The ink comprises: Glass Frit composition which is in the form of particles having a volume particle size distribution Dv90 of less than 1.5 μm, carriers (30-50 wt %) and additives (0-10%). The ceramic ink mitigate ink splattering, spreading during and after (Continued)

(a)

(b)

landing, eliminate/reduce image defects because of dust contaminations from the environment on wet inks after printing.

12 Claims, 2 Drawing Sheets

(51) Int. Cl.
    *B41M 1/34* (2006.01)
    *B41M 5/00* (2006.01)
    *C09D 11/101* (2014.01)
    *C09D 11/12* (2006.01)
    *C09D 11/34* (2014.01)
    *C09D 11/36* (2014.01)

(52) U.S. Cl.
    CPC ........... *B41M 5/007* (2013.01); *C09D 11/101* (2013.01); *C09D 11/12* (2013.01); *C09D 11/34* (2013.01); *C09D 11/36* (2013.01)

(58) Field of Classification Search
    CPC ......... C09D 11/30; C09D 11/38; C09D 11/32; C09D 11/324; C09D 11/328; C09D 11/102; C09D 11/005; C09D 11/54; C09D 11/52; C09D 11/106; B41M 1/34; B41M 5/007; B41M 5/0011; B41M 5/0017; B41M 5/0023; B41M 5/0047; B41M 7/00; B41M 7/0072; B41M 5/52; B41M 5/5218; B41M 5/5227; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04

See application file for complete search history.

(56) References Cited

U.S. PATENT DOCUMENTS

| 2015/0015638 | A1* | 1/2015 | Shipway | C09D 11/322 |
| | | | | 106/31.13 |
| 2015/0119486 | A1 | 4/2015 | Belelie et al. | |
| 2016/0280588 | A1* | 9/2016 | Gil-Torrente | C09D 11/36 |
| 2017/0107388 | A1* | 4/2017 | Wang | C09D 11/38 |

FOREIGN PATENT DOCUMENTS

| WO | 2016096632 A1 | 6/2016 |
| WO | 2017070236 A1 | 4/2017 |

* cited by examiner

DIGITAL CERAMIC INKJET INKS FOR GLASS AND METHOD FOR OBTAINING SAME

CROSS-REFERENCE TO RELATED APPLICATIONS

The present application is a 35 U.S.C. § 371 national stage application of PCT Application No. PCT/ES2019/070583, filed on Aug. 30, 2019, which claims priority to Spanish patent application no. P201830857, filed on Aug. 31, 2018, the entire contents of which are incorporated by reference in their entireties.

OBJECT OF THE INVENTION

It is the object of the present invention the development of novel ceramic inkjet inks for non-porous substrates (such as glass, metals) whereby the viscosity of the inks at the jetting temperature of 33-50° C. is 8-20 mPa·s and increase substantially to more than a factor of 5 (greater than 100 mPa·s) after landing on the substrate. The invention also relates to processing/formulating steps and tuning of the bulk and dynamic properties suitable for (i)) inkjet printing in the printhead channel and (ii) desirable high viscosity after landing on the glass substrate. These inks can be jetted reliably on ceramic surface such as glass using commercial drop on demand inkjet devices, and mitigate ink splattering, spreading during and after landing, eliminate/reduce image defects because of dust contaminations from the environment on wet inks after printing. After jetting, these inks can be dried at room temperature without the use of any external heating source such as IR lamp or oven with no side-effect on image definition and dust contamination issues.

BACKGROUND OF THE INVENTION

Digital ceramic inks for glass surface contains glass frit and inorganic pigment as main functional components. Standard commercial inkjet systems have much strict requirements in terms of both physical and chemical properties to meet printhead and jetting criteria. Most industrial inkjet printheads require fluid viscosity below 50 mPa·s in order to eject drop at velocity greater than 5 m/s. The high solid content and particle size in the ink is an issue for inkjet printhead in terms of nozzle blockage and reliable jetting. Typically, drop on demand inkjet ink should have
  8-20 mPa·s bulk viscosity at the jetting temperature,
  20-40 mN/m surface tension,
    <1 µm highly stable particle/pigment size for print reliability and to prevent nozzle blockage.

The current commercial ceramic inks for glass have more than 40 weight % of solids constituting of frits and pigments. The viscosity of such inks is generally shear thinning whereby viscosity decrease with increased shear rates. Often lower shear rate viscosity (at 1 shear rate) could be almost a factor of two or more to that of 100-1000 shear rate viscosity.

Temperature has considerable influence on the viscosity of the ink. Most inkjet inks viscosity drop by almost 50% when the temperature is doubled. Quite often, these inks are printed above the room temperature to bring the ink viscosity within the printhead specification.

Unlike ceramic tiles, the glass being a non-absorbing substrate, there are several challenges to printing inkjet ink on the glass. Often, dust from the environment lands on the wet ink substrate whilst ink is undergoing drying. Consequently, the dust penetrates the ink and resulting in post-printing defect such as fish-eyes, craters, which is distinctly visible in the final image when the ink is dried and tempered. For printing, where high lay-down volume is required, often the ink migrates due to higher thickness and results in loss of fine line definitions. Hence, it is highly recommended to print in clean room (dust free) environment to prevent issues related to dust landing on printed substrate.

Being therefore the objective of the present invention to overcome the drawbacks of the state of the are, namely:
  Increasing ink stability and reduce significant sedimentation of highly particle loaded ceramic inks containing glass frit and inorganic pigments
  Lowering printhead drive voltage required to jet due to significant drop in viscosity at jetting temperature
  eliminating ink splattering and slows down ink spreading along the edges
  Slowing/eliminating defects caused by the landing of any air borne contamination such as dust the wet paint.

DESCRIPTION OF THE INVENTION

As it has been mentioned previously the object of the invention is the development of novel ceramic inkjet inks for non-porous substrates (such as glass, metals) whereby the viscosity of the inks at the jetting temperature of 33-50° C. is 8-20 mPa·s and increase substantially to more than a factor of 5 (greater than 100 mPa·s) after landing on the substrate. The invention also relates to processing/formulating steps and tuning of the bulk and dynamic properties suitable for (i) inkjet printing in the printhead channel and (ii) desirable high viscosity after landing on the glass substrate. These inks can be jetted reliably on ceramic surface such as glass using commercial drop on demand inkjet devices, and mitigate ink splattering, spreading during and after landing, eliminate/reduce image defects because of dust contaminations from the environment on wet inks after printing. After jetting, these inks can be dried at room temperature without the use of any external heating source such as IR lamp or oven with no side-effect on image definition and dust contamination issues.

The inventions relate to novel ceramic inkjet ink compositions formulation resulting (i) hybrid thermoplastic ink and (ii) hybrid photosensitive ink. The key features are that both family of inks are liquid at room and within printhead viscosity specifications at jetting temperatures and but changes to high viscosity liquid (>100 mPa·s) on substrate after landing.

Hybrid thermoplastic inkjet ink is designed in such a way that the viscosity is around 6-20 mPa·s at a jetting temperature of 33° C. and above and increased significantly to more than 100 mPa·s when the ink temperature is dropped by less than 10° C. to ambient conditions. Compared to this, standard inkjet ink viscosity increases by a maximum factor of 2 or less for 10° C. drop in temperatures. The wet inks on substrate can be subsequently air dried or use any form of conventional dry technique, followed by tempering or high temperature cooking.

Hybrid photo-sensitive inkjet ink is designed in such a way that the viscosity is around 6-20 mPa·s at a jetting temperature of 33° C. and above. Upon landing on substrate, the ink viscosity is significantly increased to more than 100 mPa·s by partial curing of the ink using UV, IR or LED lamp. The highly viscous wet inks on substrate then can be air dried or use any form of conventional dry technique, followed by tempering or cooking at high temperature (500-750° C.) to fuse the frit on the substrates for final colour and properties.

Such novel inkjet ink with such a drastic change in ink viscosity has key benefits;

In bottle:
High ink stability and insignificant sedimentation of highly particle loaded ceramic inks containing glass frit and inorganic pigments in the bottle due to high viscosity of the ink at room temperatures.

During printing:
Lower printhead drive voltage required to jet due to significant drop in viscosity at jetting temperature (33° C. and above).

On non-porous substrate:
After jetting, once the drop lands on the substrate, the ink viscosity is rapidly increased resulting in many benefits.
Image definition: High viscosity also eliminates ink splattering and slows down ink spreading along the edges, especially when multiple drops are laid down. This helps to retain the line/image definitions.
Dust issues: Slows/eliminates defects caused by the landing of any air borne contamination such as dust the wet paint
Due to high viscosity ink at ambient conditions, inward migration of the dust on the wet ink surface is slowed resulting in "Low Dirt Intake" and hence significantly reduce defects such as fish eyes, craters on the final printed surface.

The key ink components of the inks for glass are:

Final composition of ink has 30-60% solids consisting of glass frits and inorganic pigments with a volumetric particle size: $D_{90\_vol} \leq 1.5$ μm.

Frit (15-50 Wt %)

Frit is the key component of our ceramic inkjet inks which are designed to meet both chemical and mechanical properties on the final cooked/tempered glass. The detailed compositions are varied depending on the required frit glass transition temperature, tempering and final substrate requirements, acid and base resistance. Frit is prepared by fusing variety of minerals in a furnace and then rapidly quenching the molten materials. The glass frit used in for ceramic recipe is mainly composed of $SiO_2$, $B_2O_3$ and either $Bi_2O_3$ or ZnO. Several families of glass frits are used, namely Bismuth and/or Zinc based frits.

The common components of the families frit compositions are:
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$, And the rest of the composition can be either a combination of $B_2O_3$, $Li_2O$ and ZnO, or, $B_2O_3$ and ZnO or $B_2O_3$ and $Li_2O$, or ZnO and $Li_2O$.

Examples of the glass Bismuth/Zinc frit composition (Frit F1)
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
40-55 wt. % $Bi_2O_3$,
0.5-3 wt, % ZnO
0.1-4 wt % $Li_2O$
mixture of other oxides such as CaO, BaO, MgO, $P_2O_5$, $Fe_2O_3$, SrO in an amount less than 10 wt %.

Examples of the Lithium free Bismuth/Zinc frit composition (Frit F2)
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
50-60 wt. % $Bi_2O_3$,
7-12 wt, % ZnO
mixture of other oxides such as CaO, BaO, MgO, $P_2O_5$, $Fe_2O_3$, SrO in an amount less than 10 wt %.

Examples of the Bismuth frit composition (Frit F3)
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
45-55 wt. % $B_2O_3$,
0.1-4 wt. % $Li_2O$
mixture of other oxides such as CaO, BaO, MgO, $P_2O_5$, $Fe_2O_3$, SrO in an amount less than 10 wt. %.

Examples of the Zn frit composition (Frit F4)
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
7-15 wt. % ZnO
1-5 wt % $Li_2O$ Glass frit composition is in the form of particles having a volume particle size distribution $Dv_{90}$ of less than 1.5 μm, as measured by laser diffraction. With "wt. %" it is meant weight percent of the total weight of the glass frit composition Pigments (1-25 wt %)

The inorganic pigments can be oxides of metals such as chromium oxide, titanium dioxide (for white), or mixed oxides, iron oxide for different colours. The pigments are heat resistant inorganic pigments having an average size of 2-3 microns, chemically inert and stable to ultraviolet light. They have high durability and hiding power.

Examples of suitable inorganic pigments are Cobalt chromite Blue green Spinel, Cobalt Aluminate Blue Spinel, Iron oxide red, Manganese Ferrite, Nickel Antimony Titanium Yellow Rutile, Copper Chromite Black Spinel, manganese ferrite, White titanium dioxide rutile and Anatase, Cobalt Titanate Green Spinel, Cobalt Chromite Blue Green Spinel. Brilliant bright colours yellow, oranges and red, which are capable of withstanding tempering conditions are cadmium range inorganic pigments such as Yellow 37 (Cadmium sulphide), Orange 20, Red 108 (Cadmium sulfoslenide), Yellow 35 (Zinc cadmium Sulphide).

Carriers:
30-50% solvents containing mixture of solvents to satisfy specific requirements.
Slow drying solvents to prevent ink drying in the nozzle and prevent nozzle blockage.

Fast drying solvent to prevent ink bleed/spread after landing on substrate

Non-Polar Inks

One or more linear chain hydrocarbons such kerosene, naptha: aliphatic such as cyclohexane, petroleum ether, white spirit, turpentine or a mixture thereof. The carriers can be a mixture of linear $C_{10}$-$C_{24}$ alkanes, preferably linear $C_{10}$-$C_{22}$ alkanes, more preferably linear $C_{12}$-$C_{8}$ alkanes.

Polar Inks

One or more alcohols, such as methyl alcohol, ethyl alcohol, propyl alcohols, butyl alcohols; glycols, such as methyl glycol (MG), ethyl glycol, propyl glycol, butyl glycol (BG); glycol ethers, such as methoxy propanol (PM), ethoxy propanol (EP), diacetone propanol (DAA), methoxy butanol, dipropylene glycol monomethyl ether (DPM), tripropylene glycol methyl ether (TPM), propylene glycol mono methyl ether (PM), di or tri propylene glycol mono propyl ether (DPnP, TPnP), butyl diglycol (BDG); esters, such as methyl acetate, ethyl acetate (ETAC), propyl acetate (IPAC), butyl acetate (BUAC), methoxy propyl acetate (PMA), ethyl-3-ethoxy-propanol (EEP); ketones, such as acetone, methyl ethyl ketone (MEK), methyl butyl ketone, cyclohexanone.

Aqueous Inks

Containing water and mixture of one or more alcohols, such as methyl alcohol, ethyl alcohol, propyl alcohols, butyl alcohols; glycols, such as methyl glycol (MG), ethyl glycol, propyl glycol, butyl glycol (BG); glycol ethers, such as methoxy propanol (PM), ethoxy propanol (EP), diacetone propanol (DAA), methoxy butanol, dipropylene glycol monomethyl ether (DPM), tripropylene glycol methyl ether (TPM), propylene glycol mono methyl ether (PM), di or tri propylene glycol mono propyl ether (DPnP, TPnP), butyl diglycol (BDG); esters, such as methyl acetate, ethyl acetate (ETAC), propyl acetate(IPAC), butyl acetate (BUAC), methoxy propyl acetate (PMA), ethyl-3-ethoxy-propanol (EEP), or a mixture thereof.

Thermoplastic

Suitable carriers can be mixtures of alkane waxes with a low melting point of 40-100 C, being solid at room temperature. Examples of such carriers are low melting paraffin wax.

Photosensitive Solvent

One or more solvents can be mixtures of acrylate monomers, dimers and/or oligomers, photo-initiators. The examples of such solvents could be mixture N-Vinyl caprolactam ($C_8H_{13}NO$) (1-vinyl-2-pyrrolidone), Multifunctional Acrylate, Acrylic acid, Monoalkyl-Aryl or Alkylaryl, Polyethylene Glycol diacrylate and photoinitiator such as 2-Benzyl-2-Dimethylamino-4-Morpholinobutyrophenone.

Additives

Additives: 0-10% to meet specific jetting and substrate requirements.
 Viscosity control agent (if required)
 Surfactant (reduce surface tension to 20-30 mN/m if required)
 Binders: Resins (Acrylic, alkyd, amine based)
 Anti-settling/static agent: like Aerosil, Disparlon, rheology additives etc
 Dispersant/Wetting agent
 Defoaming/Deaeration agent
 grip agents: hydroxylpropyl cellulose, methacrylic, alkyd resins Ink Physical Properties Printhead and Jetting Requirements:

Despite, larger particle size and higher solid contents, the Ink properties are tightly controlled and optimised to meet Printhead and in-flight conditions to generate reliable drops.
 Viscosity: 6-20 mPa·s at the jetting temperature and jetting conditions
  High shear bulk viscosity at room temperature is between 8-50 mPa·s
 Surface tension: 20-40 mN/m (process and substrate dependent)
 Particle size: $\Leftarrow$1.5 microns (system dependent)
 high particle stability for reliable jetting Substrate Requirements:

After landing:
 The ink properties are specially adjusted to
  Prevent drop splattering, bleed and spread after landing on hard surfaces such as glass.
  Retain edge definition of the printed image during drying and tempering Dry
 The ink formulation is tuned with appropriate resins/additives to give good grip after drying the ink on the substrate at temperature $\geq 200°$ C., for manual handling.

Final tempered properties:
 The composition of the frit (one of the main component of ceramic inkjet ink) are fine-tuned during frit preparation to meet the final substrate requirements after tempering such as
  Glass transition temperature to melt and fuse to the ceramic surfaces
  Acid resistance
  Scratch resistance
 The pigment type size and its particle interaction are adjusted during formulation to meet the
  Final tempered colour
  Hiding power and opacity.

The present invention also concerns a process for producing the ceramic inkjet ink as a process comprising of the following steps:

A. Preparing a glass frit paste (FP) by milling and grinding frit powder in the presence of a dispersant agent and a solvent to achieve a pigment volume particle size distribution $D_{v90}$ of less than 1.5 µm.

B. Preparing a pigment paste (PP) by milling and grinding inorganic pigment particles in the presence of a dispersant agent and a solvent to achieve a pigment volume particle size distribution Dv90 of less than 1 µm.

C. Mixing the frit paste of step (A) and pigment paste of step (B) in a high shear mixer or bead mixer.

D. Add a thinner constituting of mixture of solvents and additives to the concentrated ink of step (C) to achieve specific final formulations in the let-down medium, having a final solid content 30-60 wt. % on the total weight of the mixture and desired ink properties, and E. Filtering the mixture of step (D) through a micrometer pore size filter, thereby obtaining a ceramic inkjet ink having a viscosity of 6-20 mPa·s at jetting temperature and jetting conditions.

Frit Paste:

The frits are supplied in powder form with a particle size of less than 10 microns. The frit stability and particle size are maintained through multiple steps involving Milling of the jet milled frit powder (average particle size of 8-12 micron) is carried out by a high mixing shear mixer of frit powder with specific dispersant, resins (such as polyacrylate, polyalkyd and polyamide resins) with the selected choice of solvents (non-polar aliphatic hydrocarbon, Polar glycol ether family, Aqueous water, thermoplastic paraffin wax, or mixture of one or many solvents).

This is then followed by wet milling in a special chamber component such as zirconia, silicon nitrite and/or silicon carbide. The wet milling can be carried out in batch in multipass operations until the desired particle size is obtained.

The final composition is well dispersed frit paste with final particle size <1.5 μm. Examples of wet milled frit paste (FP) with different solvent type is shown below,

| Components | Bismuth-Zinc FP1-Non polar | Bismuth-Zinc FP2-Polar | Zinc FP3-Non Polar | Zinc FP4-Polar |
|---|---|---|---|---|
| Bismuth/Zinc based Frit F1 | 60-65% | 60-65% | | |
| Zinc based Frit F4 | | | 60-65% | 60-65% |
| C14-C18 n-alkanes hydrocarbon | 30-40% | | 30-40% | |
| Dipropylene glycol monomethyl ether (DPM) | | 30-40% | | 30-40% |
| Polyamide resins | 2-5% | | | |
| Disperbyk 180 | | | | 5-10% |
| Tego Dispers 656 | | | 5-10% | |

All the components are initially mixed in a high shear mixer and then milled in basket mill or horizontal wet mill with Zirconia grinding chamber for more than 24 hours. This resulted in a highly stable frit with no or minimal sedimentation with particle size ⇐1.5 μm is obtained.

B: Inorganic Pigment Paste

Inorganic colour pigments are sourced externally and supplied as powders, Standard inorganic pigments have size greater than 2-3 microns and are unsuitable inkjet applications.

Preferably, the pigment paste of step B comprises 45-85 wt. % pigment, 2-20 wt. % dispersant agent and 10-55 wt. % solvent.

The pigment is milled and grinded in the presence of a dispersant agent and a solvent, thus resulting in a pigment paste having a pigment volume particle size distribution Dv90 of less than 1 μm, preferably less than 1 μm. The combination of the dispersant agent and grinding step is crucial to obtain highly stable pigment paste with negligible/no sedimentation over long time.

Milling of the pigment powder (average particle size of 7-20 micron) is carried out by pre-mixing of pigment powder with specific dispersant, resins the selected choice of solvents (non-polar aliphatic hydrocarbon, Polar glycol ether family, Aqueous water, thermoplastic paraffin wax).

This is then followed by wet milling using basket mill or a special chamber components such as zirconia, silicon nitrite and/or silicon carbide. The wet milling can be carried out in batch in multipass operations until the desired particle size is obtained.

The choice of the dispersant and grinding steps is crucial to maintain highly stable pigment paste with little/no sedimentations over long time.

Preferably, the dispersant agent is a copolymer with acidic group (Disperbyk 110, Disperbyk 111), alkylol ammonium salt of copolymer with acidic groups (Disperbyk-180), solution of high molecular weight block copolymers with pigment affinic groups (Disperbyk 182, Disperbyk 184, Disperbyk 190), copolymer with pigment affinic groups (Disperbyk 191, Disperbyk 192, Disperbyk 194, Bykjet 9142Tego Dispers 7502, Tego Dispers 752W, Tego Dispers 1010), block-copolymer with pigment affinic groups (Disperbyk 2155), solution of alkylol ammonium salt of a higher molecular weight acidic polymer (Anti-terra-250), structured acrylate copolymer with pigment affinic groups (Disperbyk 2010, Disperbyk 2015), polyvinylpyrrolidone (PVP K-15, PVP K-30, PVP K-60), polymeric hyperdispersant (Solsperse J930, Solsperse J945, Solsperse J955, Solsperse J980, Solsperse J981, Solsperse J944, Solsperse J950, Solsperse J955), High molecular weight—polyurethane (Efka PU 4009, EFKA PU 401 high-molecular-weight carboxylic acid salts (Efka Fa4564) or a mixture thereof.

Examples of pigment paste used in the final ink formulations are given below.

PP1: Black Pigment Paste 1—Non-Polar
Inorganic Pigment: Black spinel=60%
Binder: Polyamide resins=3%
Carrier: C10-C13, n-alkanes hydrocarbon=37%
PP2: White Pigment Paste 1—Non-Polar
Inorganic Pigment: Black spinel=60%
Dispersant: Tego 1010=5%
Carrier: C10-C13, n-alkanes hydrocarbon=35%
PP3: Black Pigment Paste 2—Polar
Inorganic Pigment: Black spinel=65%
Dispersant Disperbyk 194N=7%
Carrier: DPM=23%
PP4: Black Pigment Paste 3—Aqueous
Inorganic Pigment: Black spinel=55%
Dispersant Disperbyk 194N: 10%
Additives: PVP 30=3%
Carrier: Water=22%
DPM: 10%
PP5: Blue Pigment Paste 4: Thermoplastic
Inorganic Pigment: Blue spinel=50%
Paraffin wax: 30%
Hydrocarbon aliphatic solvent: 20%
Milling temperature: 60° C.

Inkjet Ink Formulations

The final ceramic inkjet ink can also comprise additives, such as carriers, rheology agents, surfactants, anti-settling/static agents, flow and levelling agents, de-foaming/de-aeration agents, and resins. Appropriate additives can improve the surface grip after drying at temperature equal to or above 150° C., for manual handling.

The additives can be in an amount up to 10 wt. % in order to improve jetting and substrate-adhesion performances. With "wt. %" it is meant weight percent of the total weight of the ceramic inkjet ink.

Suitable surfactants can be a solution of polyether-modified polydimethylsiloxane (commercially available as BYK-301, BYK-302, BYK 306, BYK 337, BYK 341), polyether modified polydimethylsiloxane (commercially available as BYK-307, BYK 333), solution of a polyester-modified polydimethylsiloxane (commercially available as BYK-310, BYK-313) solution of polyester-modified polymethylalkylsiloxane (commercially available as BYK-315) polyether modified dimethylpolysiloxane (commercially available as BYK378), or a mixture thereof.

Suitable flow and levelling agents can be polymeric, non silicone, solution of polyester modified acrylic polymer, special dimethyl polysiloxanes (commercially available as Tego Flow ATF 2), polyether siloxane copolymer (commercially available as Tego Glide 100, Tego Wet 240), or a mixture thereof.

Suitable deaerating/defoaming agents can be Silicone free (commercially available as BYK 051, BYK 052, BYK 053, BYK 054, BYK 055, BYK 057, BYK 1752, BYK-A 535), emulsion of hydrophobic solids, emulsifiers and foam destroying polysiloxanes (commercially available as BYK-610), Fluoro-modified silicone defoamer (commercially available as Dynoadd F-470), non-silicone anionic (commercially available as Dynoadd F-603), organo-modified polysiloxane (commercially available as Tego Airex 900, Deaerating organic polymers with tip of silicone (commercially available as Tego Airex 990, Tego Airex 991), silicone free deaerator (commercially available as Tego Airex 920), solution of polyacrylate (commercially available as Tego Flow ZFS 460), or a mixture thereof.

Suitable rheology and anti-settling agents can be solution of modified urea (commercially available as BYK 410, BYK 420), solution of urea modified polyurethane (commercially available as BYK-425), solution of polyurethane with a highly branched structure (commercially available as BYK-428), solution of high molecular urea modified polar polyimide (commercially available as BYK-430, BYK-431), hybridised amide (commercially available as Disparlon AQH 800), non-ionic polyurethane based thickener (commercially available as Tego ViscoPlus 3000, Tego ViscoPlus 3030, Tego Viscoplus 3060), fumed silica (Aerosil grades), or a mixture thereof;

Suitable resins can be hydroxypropyl cellulose, hydroxyethyl cellulose, hydroxymethyl cellulose, nitrocellulose, polyacrylic (including thermoplastic, thermosetting, water-reducible, and non-aqueous dispersion acrylics), polyester, amino, polyurethane, polyisocyanates, polyalkyd, polyimide, polyaldehyde, hydrocarbon aliphatic or a mixture thereof, Examples of such resins could be Klucel grades, Degalan series, neocryls 73, Nebores BS 35-60, paraloid B67, Paroloid B82, Eurola AL1905Q, Rapsolato 7470, Laropal A81, Nytex 846, Wingtack 86, Wingtack 95.

EXPLANATION OF THE FIGURES

As a complement to the present description, and for the purpose of helping to make the characteristics of the invention more readily understandable, in accordance with a preferred practical exemplary embodiment thereof, said description is accompanied by a set of drawings constituting an integral part of the same, which by way of illustration and not limitation represent the following.

PREFERRED EMBODIMENT OF THE INVENTION

Hybrid Thermoplastic Inks

Figure 1A:
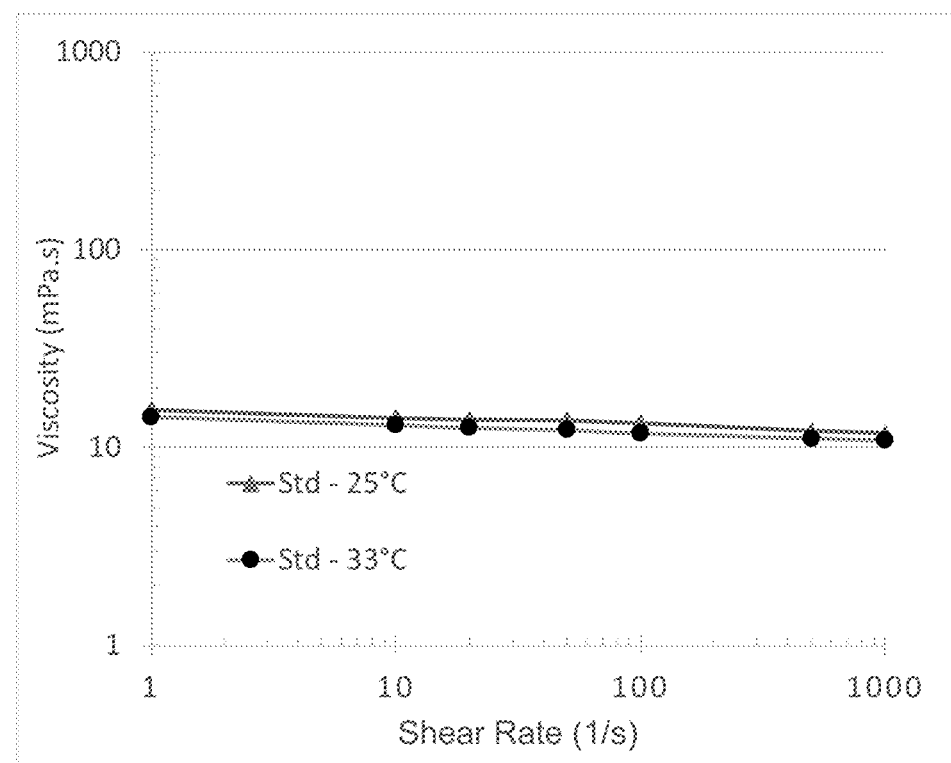
FIG. 1(a) shows the steady shear profile at 25 and 33° C. for standard ink

It is quite preferable to have a high viscosity ink once the inks lands on the glass substrate. This has many advantage
- High viscosity ink slows migration of the contaminated dust that lands on the top from penetrating into the paint and causing fish eyes, craters.
- High viscosity also eliminates ink splattering and slows down ink spreading along the edges, especially when multiple drops are laid down. This helps to retain the line/image definitions.

However, most printhead have viscosity limitation in terms of jetting capability. To meet the viscosity requirements, often these ceramics inkjet inks are jetted at 30-50 C at the jetting temperature viscosity of 8-20 mPa·s. Upon landing on substrate, the ink temperature may quickly reach substrate temperature of 20-25 C, which would often lead to increase in the viscosity of such ink to about 16-40 mPa·s.

In our novel formulation, hybrid thermoplastic inks, a small amount concentrated solution of low meting point thermoplastic material are introduced in the formulation in the let-down stage, after preparing the concentrated frit and pigment paste. The main carrier in the frit and pigment paste and hence the final ink could constitute any of the solvent type (Non-polar, polar or aqueous).

Suitable thermoplastic materials can be mixtures of alkane paraffin waxes with a low melting point of 35-60 C, being solid at room temperature.

The key of benefit of having small quantity of paraffin in the inks is to significantly alter the temperature-viscosity behaviour. With the right choice of paraffin, at the jetting temperature (in our case 33° C.), the presence of such component has little or negligible influence on the viscosity and is similar to the standard inks (around 12-13 mPa·s) within the specification of printhead requirement. However, when the temperature is dropped to 25° C., the viscosity increased by a significant factor due to the phase transition of wax. In the example illustrated below, the hybrid inks with wax, the viscosity is almost 10 times or more to around 140 mPa·s when the temperature drops to 25 C. In the case of our standard ink without the paraffin wax, the viscosity only increased from 12 to 14 mPa·s. Detailed changes in the ink viscosity at 25 and 33 C is shown in The example of the recipe comparisons of change in the rheology of standard and hybrid inks is illustrated in table below.

| Formulations | Std inks Weight % | Hybrid Thermoplastic ink A Weight % | Hybrid Thermoplastic ink B Weight % |
|---|---|---|---|
| STEP 1. Mix Step A | | | |
| Bismuth frit paste- FP1- Non-polar (60 wt % Concentrated milled Frit paste in C10-C13, n-alkanes hydrocarbon) | 58% | 58% | 58% |
| Inorganic pigment paste Black 1 (60 wt % Concentrated milled pigment paste in C10-C13, n-alkanes hydrocarbon) | 18% | 18% | 18% |
| Hydrocarbon resin | 2% | 2% | 2% |
| Acrylic resin (85 wt % in Octanol) | 10% | 10% | 8% |
| Surfactant (BYK 307) | 0.20% | 0.20% | 0.20% |
| Rheology additive (BYK 431) | 0.80% | 0.80% | 0.80% |

| Formulations | Std inks Weight % | Hybrid Thermo-plastic ink A Weight % | Hybrid Thermo-plastic ink B Weight % |
|---|---|---|---|
| STEP 2. Dissolve Paraffin wax in solvents and mix to Step 1 | | | |
| Paraffin wax | — | 5% | 8% |
| C14-C18, n-alkanes hydrocarbon | 8.6% | 4.5% | 4% |
| C11-C14, n-alkanes hydrocarbon | 2.9% | 1.5% | 1% |
| Total Weight % | 100% | 100% | 100% |
| Viscosity change from 35 to 25° C. change in temperature | | | |
| Viscosity at 33° C. (jetting conditions) at 100 shear rate (mPa · s) | 12 | 11.7 | 13.5 |
| Viscosity at 25° C. (at substrate condition) at 100 shear rate (mPa · s) | 14 | 130 | 190 |
| % Viscosity increase for 8° C. drop in temperature | 16.7% | 977% | 1307% |

Figure 1B:
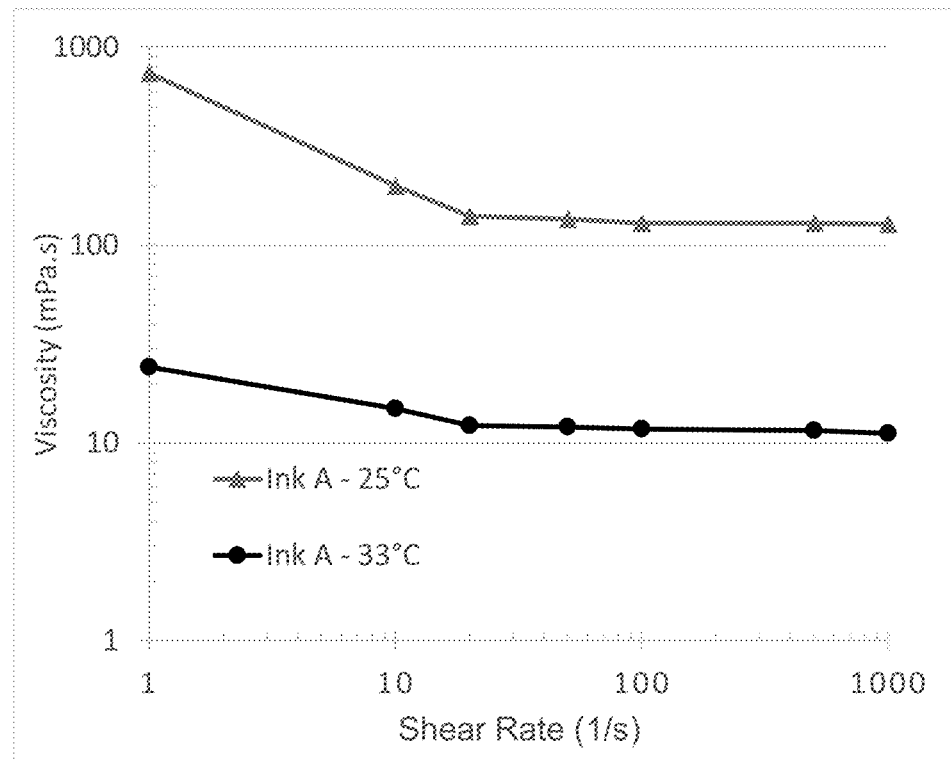
FIG. 1(b) shows the steady shear profile at 25 and 33° C. for hybrid ink A.

FIGS. 1(a) and 1(b) clearly demonstrate that at the jetting temperature both standard and hybrid ink A had similar viscosity profile around 12 mPa·s. However, hybrid ink A showed significant increase in viscosity when the temperature is dropped to 25° C. compared to modest increase for standard ink (without the thermoplastic wax).

The formulation of such hybrid inks with such drastic viscosity variation offer significant advantages:
  (i) At the jetting temperature, the inks viscosity in the channel is within the print head specification, thus requiring lower drive voltage to eject the ink,
  (ii) After landing on hard ceramic surfaces, such as glass, undesired effects such as drop splattering, bleed and spread of ink s are eliminated. Furthermore, defects caused by dust landing on the wet inks are minimised. Due to high viscosity of the ink and presence of wax on top coat, dust floats on the ink surface, rather than penetrating the glass thus eliminates defects such as fish eyes, crater on the final tempered glass.
  (iii) Due to rapid gain in viscosity once the ink is jetted on the substrate at room temperature, protect the structure of the dots for accurate colour reproduction and hence edge definition of the printed image during drying and tempering is retained.

The jetting trials of such inks showed very reliable jetting and elimination of visible defect on the printed samples as a result of dust contaminations. The photographs illustrate a scenario whereby for thermoplastic hybrid inks, the dust is seen floating on the top of the inks, where as in the case of standard ink, the dust enters into the paint and stick on the glass. The dried and tempered clearly shows a visible crater and image defect in the case of standard inks and no such defects are seen on the hybrid inks. Example of photographs is shown in FIG. 2(a) and FIG. 3(a) for ceramic blue and yellow inks.

Figures 2A, 2B:
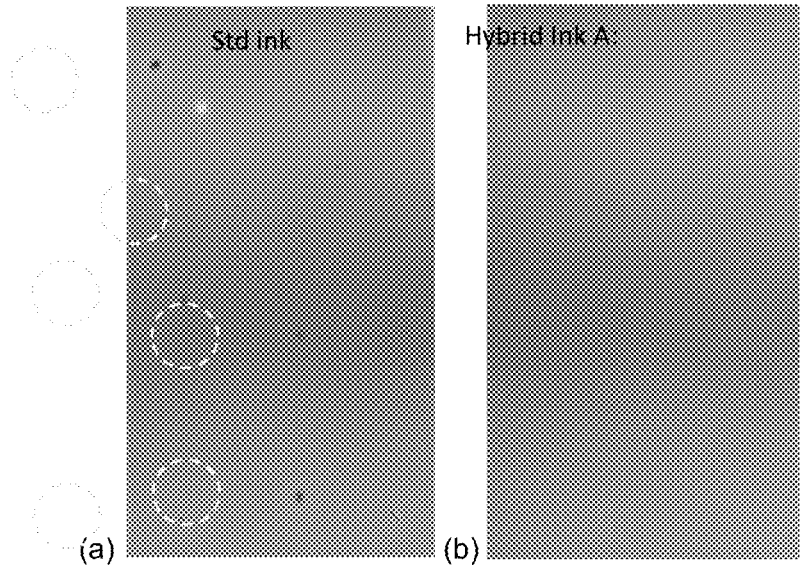
FIG. 2(a) shows the effect of dust contamination on the wet printed samples with (a) standard Blue inks.
FIG. 2(b) shows the effect of dust contamination on the wet printed samples with hybrid Blue ink A.
Figures 3A, 3B:
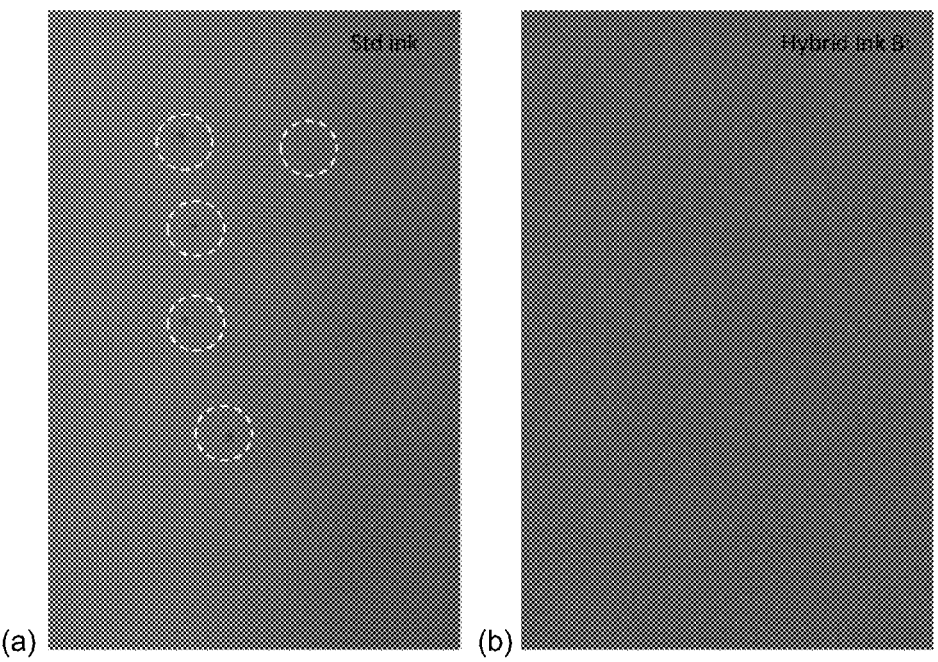
FIG. 3(a) shows the effect of dust contamination on the wet printed samples with (a) standard Yellow inks.
FIG. 3(b) shows the effect of dust contamination on the wet printed samples with hybrid Yellow ink.

In FIG. 2(a) can be observed the Effect of dust contamination on the wet printed samples with standard Blue inks, whose effects are that dust from the environmental leads to considerable number of defects such as cratering as highlighted, while in FIG. 2(b) hybrid Blue ink A in which little or negligible influence of the dust on final image there are not noticeable crater visible.

FIG. 3 shows the effect of dust contamination on the wet printed samples with (a) standard Yellow inks wherein dust from the environmental leads to considerable number of defects such as cratering as highlighted, and (b) with hybrid Yellow ink wherein little or negligible influence of the dust on final image there are Not noticeable crater visible.

Hybrid Photo-Sensitive Inks

In this novel formulation, the viscosity of the ink is drastically increased after landing on the substrate (straight after jetting) by introducing small quantity of photo-sensitive solvents such as UV sensitive multi-functional acrylates (eg, Sartomer 506, Sartomer 399, Ebercryl 965), LED sensitive solvents, or Infrared sensitive resins in the inks in the let-down during Stage D after preparing the concentrated fit and pigment paste. The carrier in the frit and pigment paste and hence the final ink could constitute any of the solvent type (Non-polar, polar or aqueous).

Once the ink is landed on the substrate, partial curing of these solvents is initiated in presence of their light source, thus significantly increasing the ink viscosity whilst still retaining as liquid.

The key of benefit of increasing ink viscosity on substrate is same as described earlier for hybrid thermoplastic ink, mainly retaining image definition, elimination of drop splattering and spread and mitigate defects caused by dust landing on the coating ink.

The example of the recipe in the rheology of standard and hybrid photo-sensitive inks is illustrated in table below.

| Formulations | Std inks Weight % | Hybrid photo-sensitive ink C Weight % | Hybrid photo-sensitive ink D Weight % |
|---|---|---|---|
| STEP 1. Mix Step A | | | |
| Bismuth frit paste- FP1- Non-polar (60 wt % Concentrated milled Frit paste in C10-C13, n-alkanes hydrocarbon) | 60% | 60% | 60% |
| Inorganic pigment paste White1 PP2 (60 wt % Concentrated milled pigment paste in C10-C13, n-alkanes hydrocarbon) | 16% | 16% | 16% |
| Hydrocarbon resin | 2% | 2% | 2% |
| Acrylic resin (85 wt % in Octanol) | 10% | 10% | 8% |
| Surfactant (BYK 307) | 0.20% | 0.20% | 0.20% |
| Rheology additive (BYK 431) | 0.80% | | |
| STEP 2. Mix photosensitive material and thinners and mix to Step 1 | | | |
| Multifunctional Acrylate | — | 5% | 10% |
| Photo initiator | | 0.2% | 0.4% |
| C14-C18, n-alkanes hydrocarbon | 8.6% | 13.6% | 9.4% |
| C11-C14, n-alkanes hydrocarbon | 2.9% | 5% | 4% |
| Total Weight % | 100% | 100% | 100% |

The invention claimed is:

1. Digital ceramic inject inks for glass comprising:
   Glass Frit composition being present between 25 wt. % and 60 wt. % which is in the form of particles having a volume particle size distribution Dv90 of less than 1.5 µm, as measured by laser diffraction;
   Inorganic pigments being present between 1 wt. % and 25 wt. % comprising oxides of metals and are heat resistant inorganic pigments having an average size of 2-3 microns, chemically inert and stable to ultraviolet light;

Carriers being present between 30 wt. % and 40 wt %, comprising mainly of polar, non-polar or Aqueous solvents;

Additives being present between 0 wt. % and 10 wt %;

wherein the solvents are also less than 10 wt. % mixtures of alkane waxes with a low melting point of 40-100° C., being solid at room temperature.

2. The digital ceramic inject inks for glass according to claim 1, wherein
the glass Frit composition has in wt % weight percent of the total weight of the glass frit composition:
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
And the rest of the composition up to 100 wt % is either a combination of $B_2O_3$, $Li_2O$ and ZnO, or, $B_2O_3$ and ZnO or $B_2O_3$ and $Li_2O$, or ZnO and $Li_2O$
the oxides metals of the Inorganic pigments (1-25 Wt %) are such as chromium oxide, titanium dioxide (for white), or mixed oxides, iron oxide for different colours, are heat resistant inorganic pigments having an average size of 2-3 microns, chemically inert and stable to ultraviolet light,
the carriers (30-40 wt %), are additionally one of the following types:
Non polar inks;
Polar inks; or
Aqueous ink
the Additives, 0-10 wt % are one or a combination of:
Carriers, rheology agents, surfactants, anti-settling/static agents, flow and levelling agents, de-foaming/de-aeration agents, and resins; the additives can be in an amount up to 10 wt. %.

3. The digital ceramic inject inks for glass according to claim 1, wherein the glass frit composition is one of the following:
glass Bismuth/Zinc frit composition Frit F1 including:
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
40-55 wt. % $Bi_2O_3$,
0.5-3 wt. % ZnO,
0.1-4 wt % $Li_2O$,
mixture of other oxides such as CaO, BaO, MgO, $P_2O_5$, $Fe_2O_3$, SrO in an amount less than 10 wt %; or
Lithium free Bismuth/Zinc frit composition Frit F2 including:
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
50-60 wt. % $Bi_2O_3$,
7-12 wt. % ZnO,
mixture of other oxides such as CaO, BaO, MgO, $P_2O_5$, $Fe_2O_3$, SrO in an amount less than 10 wt %; or
Bismuth frit composition Frit F3 including:
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
45-55 wt. % $Bi_2O_3$,
0.1-4 wt. % $Li_2O$
mixture of other oxides such as CaO, BaO, MgO, $P_2O_5$, $Fe_2O_3$, SrO in an amount less than 10 wt. %; or
Zn frit composition Frit F4 including:
20-49 wt. % $SiO_2$,
3-20 wt. % $B_2O_3$,
1-9 wt. % $Na_2O$,
0.1-5 wt. % $K_2O$,
1-7 wt. % $TiO_2$,
0.01-1 wt. % $Al_2O_3$,
7-15 wt. % ZnO,
1-5 wt % $Li_2O$.

4. The digital ceramic inject inks for glass according to claim 2, wherein the inorganic pigments are Cobalt chromite Blue green Spinel, Cobalt Aluminate Blue Spinel, Iron oxide red, Manganese Ferrite, Nickel Antimony Titanium Yellow Rutile, Copper Chromite Black Spinel, manganese ferrite, White titanium dioxide rutile and Anatase, Cobalt Titanate Green Spinel, Cobalt Chromite Blue Green Spinel; Brilliant bright colours yellow, oranges and red, which are capable of withstanding tempering conditions are cadmium range inorganic pigments such as Yellow 37 (Cadmium sulphide), Orange 20, Red 108 (Cadmium sulfoslenide) and Yellow 35 (Zinc cadmium Sulphide).

5. The digital ceramic inject inks for glass according to claim 2, wherein the carriers are a mixture of linear $C_{10}$-$C_{24}$ alkanes, preferably linear $C_{10}$-$C_{22}$ alkanes, more preferably linear $C_{12}$-$C_{18}$ alkanes.

6. The digital ceramic inject inks for glass according to claim 2, wherein the carriers are one or more alcohols, such as methyl alcohol, ethyl alcohol, propyl alcohols, butyl alcohols; glycols, such as methyl glycol (MG), ethyl glycol, propyl glycol, butyl glycol (BG); glycol ethers, such as methoxy propanol (PM), ethoxy propanol (EP), diacetone propanol (DAA), methoxy butanol, dipropylene glycol monomethyl ether (DPM), tripropylene glycol methyl ether (TPM), propylene glycol mono methyl ether (PM), di or tri propylene glycol mono propyl ether (DPnP, TPnP), butyl diglycol (BDG); esters, such as methyl acetate, ethyl acetate (ETAC), propyl acetate(IPAC), butyl acetate (BUAC), methoxy propyl acetate (PMA), ethyl-3-ethoxy-propanol (EEP); ketones, such as acetone, methyl ethyl ketone (MEK), methyl butyl ketone, cyclohexanone.

7. The digital ceramic inject inks for glass according to claim 2, wherein the carriers are water and mixture of one or more alcohols, such as methyl alcohol, ethyl alcohol, propyl alcohols, butyl alcohols; glycols, such as methyl glycol (MG), ethyl glycol, propyl glycol, butyl glycol (BG); glycol ethers, such as methoxy propanol (PM), ethoxy propanol (EP), diacetone propanol (DAA), methoxy butanol, dipropylene glycol monomethyl ether (DPM), tripropylene glycol methyl ether (TPM), propylene glycol mono methyl ether (PM), di or tri propylene glycol mono propyl ether (DPnP, TPnP), butyl diglycol (BDG); esters, such as methyl acetate, ethyl acetate (ETAC), propyl acetate(IPAC), butyl acetate (BUAC), methoxy propyl acetate (PMA), ethyl-3-ethoxy-propanol (EEP), or a mixture thereof.

8. A process for manufacturing the digital ceramic inks for glass according to claim 1, wherein the process comprises the following steps:
A. Preparing a glass frit paste (FP) by milling and grinding frit powder in the presence of a dispersant agent and a solvent to achieve a pigment volume particle size distribution $D_{v90}$ of less than 1.5 µm;

B. Preparing an inorganic pigment paste (PP) by milling and grinding pigment particles in the presence of a dispersant agent and a solvent to achieve a pigment volume particle size distribution Dv90 of less than 1 µm;

C. Mixing the frit paste of step (A) and pigment paste of step (B) in a high shear mixer or bead mixer;

D. Add a thinner constituting of mixture of solvents and additives to the concentrated ink of step (C) to achieve specific final formulations in the let-down medium, having a final solid content 30-60 wt. % on the total weight of the mixture and desired ink properties; and E. Filtering the mixture of step (D) through a micrometer pore size filter, thereby obtaining a ceramic inkjet ink having a viscosity of 6-20 mPa·s at jetting temperature and jetting conditions.

9. The process for manufacturing the digital ceramic inks according to claim 7, wherein in the milling for preparation of the frit paste is carried out by a mixing shear mixer of frit powder with dispersant, resins (such as polyacrylate, polyalkyd and polyamide resins) an a selection of solvents (non-polar aliphatic hydrocarbon, Polar glycol ether family, Aqueous water, thermoplastic paraffin wax, or mixture of one or many solvents), being followed by wet milling in a chamber component such as zirconia, silicon nitrite and/or silicon carbide and the final composition is dispersed frit paste with final particle size <1.5 µm.

10. The process for manufacturing the digital ceramic inks according to claim 9, wherein the wet milled frit paste is one of the following table:

| Components | Bismuth-Zinc FP1-Non polar | Bismuth-Zinc FP2-Polar | Zinc FP3-Non Polar | Zinc FP4-Polar |
|---|---|---|---|---|
| Bismuth/Zinc based Frit F1 | 60-65% | 60-65% | | |
| Zinc based Frit F4 | | | 60-65% | 60-65% |
| C14-C18, n-alkanes hydrocarbon | 30-40% | | 30-40% | |
| Dipropylene glycol monomethyl ether (DPM) | | 30-40% | | 30-40% |
| Polyamide resins | 2-5% | | | |
| Disperbyk 180 | | | | 5-10% |
| Tego Dispers 656 | | | 5-10% | |

11. The process for manufacturing the digital ceramic inks according to claim 8, wherein the inorganic pigment paste comprises 45-85 wt. % pigment, 2-20 wt. % dispersant agent and 10-55 wt. % solvent wherein the pigment is milled and grinded in the presence of a dispersant agent and a solvent, wherein the milling of the pigment powder (average particle size of 7-20 micron) is carried out by pre-mixing of pigment powder with specific dispersant, resins the selected choice of solvents (non-polar aliphatic hydrocarbon, Polar glycol ether family, Aqueous water, thermoplastic paraffin wax), this is then followed by wet milling using basket mill or a chamber components such as zirconia, silicon nitrite and/or silicon carbide.

12. The process for manufacturing the digital ceramic inks according to claim 11, wherein the dispersant agent is a copolymer with acidic group Disperbyk 110, Disperbyk 111; alkylol ammonium salt of copolymer with acidic groups Disperbyk-180), solution of high molecular weight block copolymers with pigment affinic groups Disperbyk 182, Disperbyk 184, Disperbyk 190; copolymer with pigment affinic groups Disperbyk 191, Disperbyk 192, Disperbyk 194, Bykjet 9142Tego Dispers 7502, Tego Dispers 752W; block-copolymer with pigment affinic groups Disperbyk 2155; solution of alkylol ammonium salt of a higher molecular weight acidic polymer Anti-terra-250; structured acrylate copolymer with pigment affinic groups (Disperbyk 2010, Disperbyk 2015), polyvinylpyrrolidone, PVP K-15, PVP K-30, PVP K-60; polymeric hyperdispersant Solsperse J930, Solsperse J945, Solsperse J955, Solsperse J980, Solsperse J981, Solsperse J944, Solsperse J950, Solsperse J955: High molecular weight—polyurethane Efka PU 4009, EFKA PU 4010; high-molecular-weight carboxylic acid salts (Efka Fa4564) or a mixture thereof.

* * * * *